(12) United States Patent
Nie et al.

(10) Patent No.: US 9,323,030 B2
(45) Date of Patent: Apr. 26, 2016

(54) OPTICAL FOCUSING SYSTEM

(71) Applicant: Union Optech Co., Ltd., Zhongshan (CN)

(72) Inventors: Runtao Nie, Zhongshan (CN); Mingzhi Xiao, Zhongshan (CN)

(73) Assignee: UNION OPTECH CO., LTD., Zhongshan (CN)

( * ) Notice: Subject to any disclaimer, the term of this patent is extended or adjusted under 35 U.S.C. 154(b) by 0 days.

(21) Appl. No.: 14/495,869

(22) Filed: Sep. 24, 2014

(65) Prior Publication Data

US 2015/0338617 A1    Nov. 26, 2015

(30) Foreign Application Priority Data

May 21, 2014 (CN) .......................... 2014 1 0217018

(51) Int. Cl.
*G02B 17/00* (2006.01)
*G02B 13/00* (2006.01)
*G02B 5/08* (2006.01)
*G02B 5/04* (2006.01)

(52) U.S. Cl.
CPC .......... *G02B 13/0065* (2013.01); *G02B 13/007* (2013.01); *G02B 5/04* (2013.01); *G02B 5/08* (2013.01)

(58) Field of Classification Search
CPC .................................................. G02B 19/0028
USPC .......................................................... 359/726
See application file for complete search history.

(56) References Cited

U.S. PATENT DOCUMENTS

2006/0092524 A1* 5/2006 Konno ................. G02B 13/003
                                                          359/678
2012/0075726 A1* 3/2012 Takakubo .......... G02B 13/0065
                                                          359/726

* cited by examiner

*Primary Examiner* — James Jones
(74) *Attorney, Agent, or Firm* — Matthias Scholl, PC; Matthias Scholl

(57) ABSTRACT

An optical focusing system, including: a lens group, a first reflective optical element, a second reflective optical element, and an optical sensing imaging surface. The first reflective optical element is disposed on an object end and the second reflective optical element is disposed at an image end, for reflecting light rays. The optical sensing imaging surface is disposed at the emergent surface of the second reflective optical element.

16 Claims, 3 Drawing Sheets

OPTICAL FOCUSING SYSTEM

CROSS-REFERENCE TO RELATED APPLICATIONS

Pursuant to 35 U.S.C. §119 and the Paris Convention Treaty, this application claims the benefit of Chinese Patent Application No. 201410217018.7 filed May 21, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to an optical focusing system.

2. Description of the Related Art

Thin optical lenses that have high resolution are quite desirable. However, such lenses are expensive. Also, conventional processes cannot meet the current requirements on resolution and thinness.

SUMMARY OF THE INVENTION

In view of the above-described problems, it is one objective of the invention to provide an optical focusing system that is thin, light-weighted, and highly practicable. The optical focusing system can be applied to a camera of a smartphone, a tablet PC, and a card type digital camera, whereby simplifying the camera structure.

To achieve the above objective, in accordance with one embodiment of the invention, there is provided an optical focusing system. The optical focusing system comprises: a lens group, a first reflective optical element, a second reflective optical element, and an optical sensing imaging surface. The first reflective optical element is disposed on an object end and the second reflective optical element is disposed at an image end, for reflecting light rays. The optical sensing imaging surface is disposed at an emergent surface of the second reflective optical element disposed at the image end.

In a class of this embodiment, an included angle between an incident ray and an emergent ray on the first/second reflective optical element is 90°.

In a class of this embodiment, the first/second reflective optical element is a plane minor or a prism in the shape of an isosceles right triangle.

In a class of this embodiment, an incident surface of the first reflective optical and an emergent surface of the second reflective optical element are disposed at the same side or at opposite sides.

In a class of this embodiment, the first/second reflective optical element is a prism in the shape of an isosceles right triangle, an incident surface thereof is a flat surface, a spherical surface, or a non-spherical surface, and an emergent surface thereof is a flat surface, a spherical surface, or a non-spherical surface.

In a class of this embodiment, an included angle between a reflective surface of the first/second optical element and an optical axis of the optical focusing system is 45°.

In a class of this embodiment, an incident lens group is disposed between an incident ray and the first reflective optical element. An emergent lens group is disposed between the second reflective optical element and the optical sensing imaging surface.

In a class of this embodiment, the lens group comprises at least one lens.

In a class of this embodiment, both the incident lens group and the emergent lens group comprise at least one lens.

Advantages according to embodiments of the invention are summarized as follows:

1. The optical focusing system of the invention is able to deflect the light and realize a thin appearance of the imaging system structure.
2. A principal ray angle of the emergent ray of the high resolution optical imaging system can reach approximately 0°.
3. A plurality of the reflective optical elements and the lens group optical system are integrated as a whole, so that the thin design of the camera structure is achieved, the light weight and thin appearance of the intelligent high-end smartphone, the tablet PC, and the card type digital camera are satisfied, and the practical effect is good.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an optical focusing system are described below. It should be noted that the following examples are intended to describe and not to limit the invention.

EXAMPLE 1.1

Figure 1:
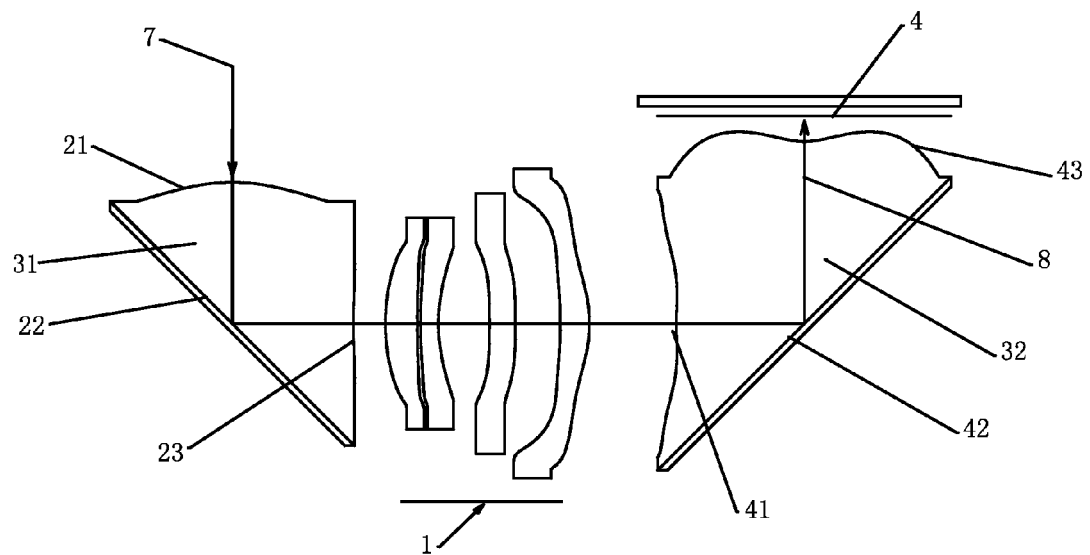
FIG. 1 is a structure diagram of an optical focusing system in accordance with Example 1.1.

As shown in FIG. 1, an incident ray 7 passes through a first reflective optical element 31, that is, a first non-spherical incident surface 21, a first reflective surface 22, and a first non-spherical emergent surface 23. An incident angle of the incident ray is 45°. The light then passes through a lens group 1 and enters a second reflective optical element 32, that is, a second non-spherical incident surface 41, a second reflective surface 42, and a second non-spherical emergent surface 43. An emergent ray 8 is in parallel with the incident ray 7 and travels upwards to enter an optical sensing imaging surface 4.

The focusable lens group 1 is finely regulated forward and backward along an optical axis, whereby ensuring a clear image.

EXAMPLE 1.2

Figure 2:
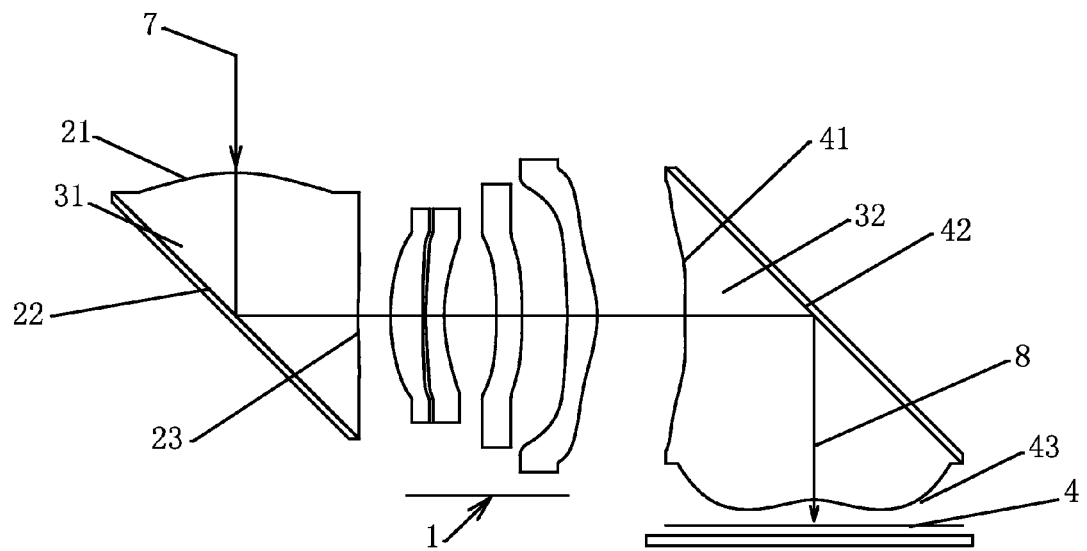
FIG. 2 is a structure diagram of an optical focusing system in accordance with Example 1.2.

As shown in FIG. 2, an optical focus system of Example 1.2 is the same as that of Example 1.1 except that the emergent ray 8 is in parallel with the incident ray and travels downwards to enter the optical sensing imaging surface 4.

EXAMPLE 2.1

Figure 3:
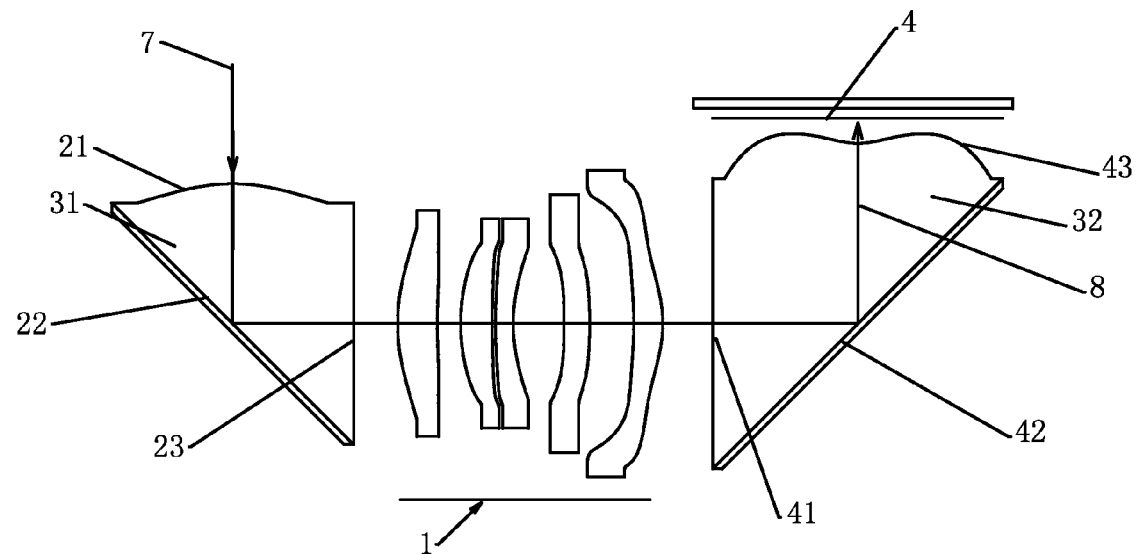
FIG. 3 is a structure diagram of an optical focusing system in accordance with Example 2.1.

As shown in FIG. 3, an incident ray 7 passes through a first reflective optical element 31, that is, a non-spherical incident surface 21, a first reflective surface 22, and a planar emergent surface 23. An incident angle of the incident ray is 45°. The light then passes through a lens group 1 and enters a second reflective optical element 32, that is, a planar incident surface 41, a second reflective surface 42, and a non-spherical emergent surface 43. An emergent ray 8 is in parallel with the incident ray 7 and travels upwards to enter an optical sensing imaging surface 4.

The focusable lens group 1 is finely regulated forward and backward along an optical axis, whereby ensuring a clear image.

EXAMPLE 2.2

Figure 4:
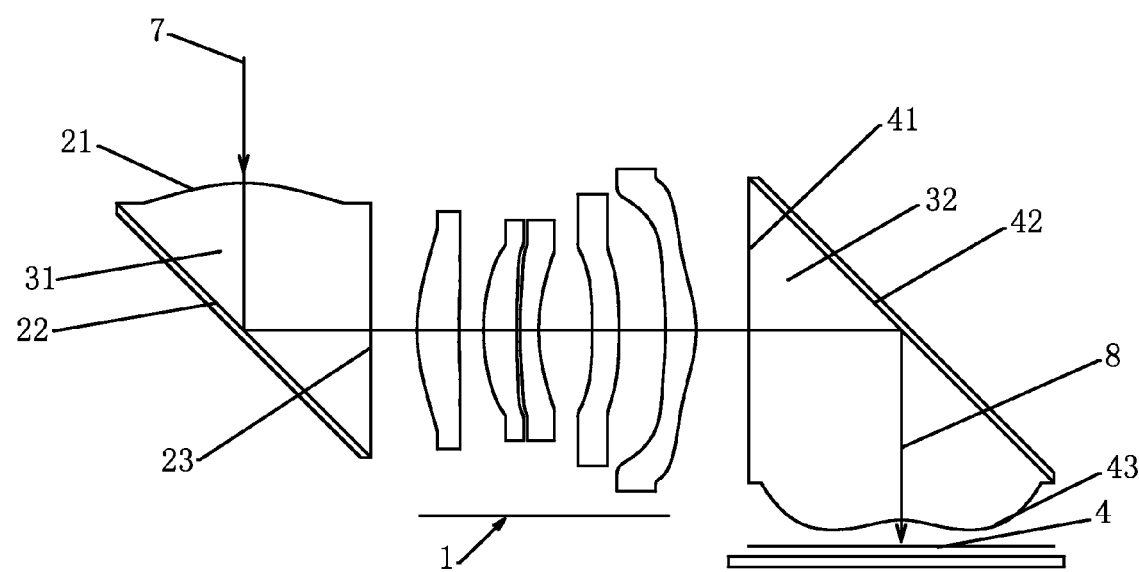
FIG. 4 is a structure diagram of an optical focusing system in accordance with Example 2.2.

As shown in FIG. 4, an optical focus system of Example 2.2 is the same as that of Example 2.1 except that the emergent ray 8 is in parallel with the incident ray and travels downwards to enter the optical sensing imaging surface 4.

EXAMPLE 3.1

Figure 5:
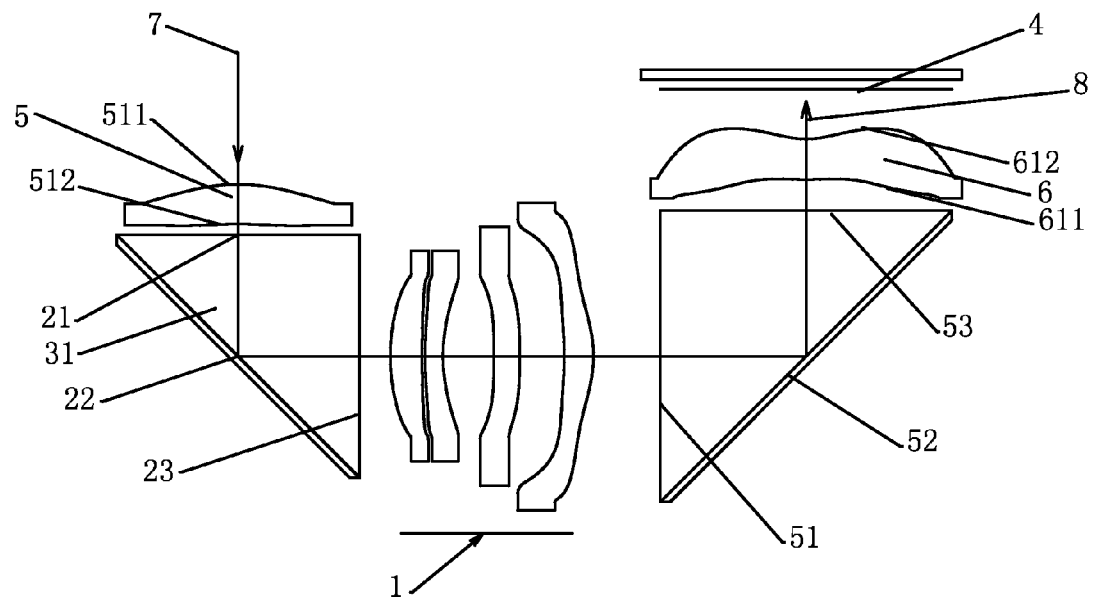
FIG. 5 is a structure diagram of an optical focusing system in accordance with Example 3.1.

As shown in FIG. 5, an incident ray 7 passes through a first non-spherical surface 511 and a second non-spherical surface 512 of an incident lens group 5, and passes through a first reflective optical element 31 that is disposed near an object and is a flat rectangular prism comprising a first incident surface 21, a first reflective surface 22, and a first emergent surface 23. An incident angle of the incident ray is 45°. The light then passes through a lens group 1, and enters a second reflective optical element 32 that is disposed near an image and is a planar prism comprising a second incident surface 51, a second reflective surface 52, and a second emergent surface 53. An emergent angel is 45°. An emergent ray passes through a third non-spherical surface 611 and a fourth non-spherical surface 612 of an emergent lens group 6 and is in parallel with the incident ray 7 and travels upwards to enter and optical sensing imaging surface 4.

The focusable lens group 1 is finely regulated forward and backward along an optical axis, whereby ensuring a clear image.

EXAMPLE 3.2

Figure 6:
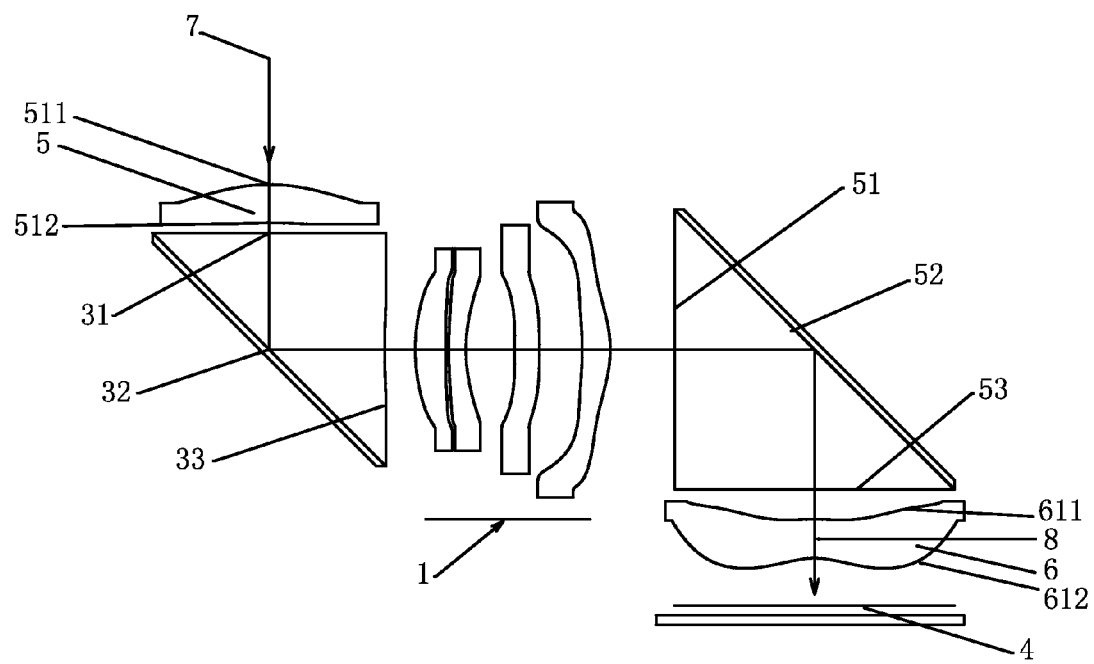
FIG. 6 is a structure diagram of an optical focusing system in accordance with Example 3.2.

As shown in FIG. 6, an optical focus system of Example 3.2 is the same as that of Example 3.1 except that the emergent ray 8 is in parallel with the incident ray and travels downwards to enter the optical sensing imaging surface 4.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An optical focusing system, comprising:
a) a lens group;
b) a first reflective optical element;
c) a second reflective optical element; and
d) an optical sensing imaging surface;
wherein:

the first reflective optical element comprises a first incident surface, a first reflective surface, and a first emergent surface;
the second reflective optical element comprises a second incident surface, a second reflective surface, and a second emergent surface;
the second emergent surface is aspherical and has a wavy shape;
the second emergent surface comprises a first convex part, a second convex part, and a concave part;
the concave part is disposed between the first convex part and the second convex part;
the first reflective optical element is disposed on an object end and the second reflective optical element is disposed at an image end, for reflecting light rays; and
the optical sensing imaging surface is disposed at an emergent surface of the second reflective optical element disposed at the image end.

2. The system of claim 1, wherein an included angle between an incident ray and an emergent ray on the first/second reflective optical element is 90°.

3. The system of claim 1, wherein the first/second reflective optical element is a prism, and the first/second reflective surface is a plane mirror.

4. The system of claim 2, wherein the first/second reflective optical element is a prism, and the first/second reflective surface is a plane mirror.

5. The system of claim 1, wherein the first incident surface and the second emergent surface are disposed at the same side or at opposite sides.

6. The system of claim 2, wherein the first incident surface and the second emergent surface are disposed at the same side or at opposite sides.

7. The system of claim 3, wherein
the first incident surface is flat, spherical, or aspherical; and
the first emergent surface is flat, spherical, or aspherical.

8. The system of claim 4, wherein
the first incident surface is flat, spherical, or aspherical; and
the first emergent surface is flat, spherical, or aspherical.

9. The system of claim 3, wherein an included angle between the first/second reflective surface and an optical axis of the optical focusing system is 45°.

10. The system of claim 4, wherein an included angle between the first/second reflective surface and an optical axis of the optical focusing system is 45°.

11. The system of claim 5, wherein
an incident lens group is disposed between an incident ray and the first reflective optical element; and
an emergent lens group is disposed between the second reflective optical element and the optical sensing imaging surface.

12. The system of claim 6, wherein
an incident lens group is disposed between an incident ray and the first reflective optical element; and
an emergent lens group is disposed between the second reflective optical element and the optical sensing imaging surface.

13. The system of claim 3, wherein the lens group comprises at least one lens.

14. The system of claim 4, wherein the lens group comprises at least one lens.

15. The system of claim 11, wherein both the incident lens group and the emergent lens group comprise at least one lens.

16. The system of claim 12, wherein both the incident lens group and the emergent lens group comprise at least one lens.

* * * * *